United States Patent Office 3,177,270
Patented Apr. 6, 1965

3,177,270
GRAFT COPOLYMERS OF POLYOLEFINS AND MONOVINYL AROMATIC COMPOUNDS AND METHOD OF MAKING THE SAME
Giffin D. Jones and Robert M. Nowak, Midland, Mich., assignors to The Dow Chemical Company, Midland, Mich., a corporation of Delaware
No Drawing. Filed Oct. 10, 1960, Ser. No. 61,400
9 Claims. (Cl. 260—878)

This invention concerns a method of making graft copolymers comprising polyolefins and vinyl aromatic compounds and mixtures of vinyl aromatic compounds and other monoethylenically unsaturated monomers, and pertains to compositions comprising the graft copolymer and homopolymers and copolymers of the monomers. It relates more particularly to an improved method for making such graft copolymers and pertains to the graft copolymer products.

It is known to prepare polymeric products by subjecting a mixture of a polymerizable monomeric olefinic compound and a linear polymer in the absence of oxygen to an agitation treatment sufficient to degrade the linear polymer and thereby yield a polymer in the molecular structure of which the olefinic compound forms a part.

It is known to prepare polymeric products comprising graft copolymers by for example, polymerizing a monomer in the presence of, or in admixture with, a latex of an already formed polymer in an aqueous emulsion and in the presence or absence of an added polymerization catalyst.

It has now been discovered that graft copolymers of normally solid thermoplastic resinous homopolymers and copolymers of one or more aliphatic olefins containing from 2 to 4 carbon atoms in the molecule and copolymers containing a predominant amount of one or more of such aliphatic olefins chemically combined or interpolymerized in the copolymer molecules can readily be prepared in good yield by a procedure which consists essentially of malaxing the normally solid thermoplastic olefin polymer at elevated heat-plastifying temperatures between 110° and 250° C. while contacting the heat-softened or molten polymer with a minor proportion, i.e., 50 percent by weight or less of the total mixture of a monovinyl aromatic compound or a mixture of a predominant amount of at least one monovinyl aromatic compound and another monomer such as acrylic acid, methacrylic acid, acrylonitrile, methyl methacrylate, methacrylonitrile or maleic anhydride, or a mixture of such monomers, having dissolved therein from 0.5 to 5 percent by weight of a peroxygen compound having a half-life of at least 15 minutes as determined by its decomposition rate in benzene at 100° C.

It is important that the malaxing, i.e., the kneading, rubbing, mixing or stirring, of the heat-plastified or molten olefin polymer in contact with the monomer containing the peroxygen compound, be carried out in such manner as to avoid appreciable breakdown or degrading of the polymer molecules such as by carrying out the malaxing in a plastics screw type extruder or a Banbury mixer.

It has further been found that by malaxing the heat-softened or molten polymer with the monomeric compounds containing the peroxygen compound dissolved therein that there appears to be formed a large number of grafting sites along the olefin polymer chains with the resultant formation of graft copolymers consisting predominantly of the substrate polymer having attached thereto a large number of grafted-on chains of the monomer units of relatively short chain length. Such polymers are unique, and differ in their chemical composition and properties from graft copolymers consisting of substrate polymers having relatively few grafted-on chains of monomer units of long chain length, but of otherwise similar chemical composition.

The polymeric substrate to be employed in preparing the graft copolymers is preferably a homopolymer or copolymer of one or more aliphatic olefins containing from two to four carbon atoms in the molecule such as polyethylene, polypropylene, polyisobutylene, polybutene, copolymers of ethylene and propylene, copolymers of ethylene and isobutylene, or copolymers of ethylene and butene, although copolymers containing a predominant amount, i.e., 50 percent by weight or more, of one or more of the aliphatic olefins chemically combined or interpolymerized with a minor proportion of another monoethylenically unsaturated organic compound can be used, such as copolymers of a predominant amount by weight of ethylene and a minor proportion of styrene, vinyl acetate, or methyl methacrylate.

The monomers to be graft copolymerized onto the polymeric substrate can be monovinyl aromatic compounds such as styrene, vinyltoluene, vinylxylene, ethylvinylbenzene, isopropyl styrene, para-tert.-butylstyrene, dichlorostyrene, bromostyrene, fluorostyrene or mixtures of a predominant amount of one or more of such monovinyl aromatic compounds with a minor amount of another monoethylenically unsaturated monomer such as acrylic acid, methacrylic acid, acrylonitrile, methacrylonitrile, methyl methacrylate or maleic anhydride or mixtures of said compounds in any and all proportions. The monomer is employed in amounts corresponding to from 1 to 100, preferably from about 5 to about 50 parts by weight per 100 parts by weight of the olefin polymer starting material, and preferably contains a polymerization inhibitor such as tert.-butyl catechol, hydroquinone or monomethyl ether of hydroquinone in amounts of about 0.02 percent by weight, but an inhibitor is not required.

The organic peroxygen compound to be employed as the agent for initiating the graft copolymerization reaction between the monomeric compound and the polymer starting material at the elevated heat-plastifying temperatures at which the graft copolymerization reaction is carried out can be any organic peroxygen compound which is a polymerization catalyst for the monomer and has a half-life of at least 15 minutes as determined by its decomposition rate in benzene at 100° C. Among suitable organic peroxygen compounds are tert.-butyl peracetate, tert.-butyl perbenzoate, di-tert.-butyl diperphthalate, tert.-butyl hydroperoxide, di-tert.-butyl peroxide, cumene hydroperoxide, dicumyl peroxide, benzoyl peroxide, and the like. Mixtures of any two or more of the organic peroxygen compounds can be used. The organic peroxygen compound can be used in amounts corresponding to from 0.5 to 5 percent by weight of the monomeric acid. A method of determining the heat stability of organic peroxides has been described by D. F. Doehnert and O. L. Mageli, The Society Plastics Industry Inc. (preliminary copy of a report to be presented at the 13th Annual Meeting of the Reinforced Plastics Division, Chicago, Illinois).

In practice, the polymer, e.g., polyethylene or polypropylene, in the form of molding powder or granules, is fed to a plastics extruder wherein it is pressed and heated to a flowable or molten condition at temperatures between 110° and 250° C., and above the crystalline melting point of the polymer, under pressure. The monomeric vinyl aromatic compound or mixture thereof with acrylic acid, methacrylic acid, acrylonitrile, methacrylonitrile or maleic anhydride, containing the organic peroxygen compound dissolved therein is fed under pressure into a mid-section of the barrell of the extruder and into contact with the heat-plastified or molten polymer.

The resulting mixture is maintained molten or flowable and is blended into a homogeneous composition as it is forwarded by action of the screw in the barrel of the plastics extruder toward the discharge orifice or die. During contact and blending of the monomeric compound containing the peroxygen compound with the heat-plastified olefin polymer at the elevated temperatures, the peroxygen compound undergoes decomposition with resultant initiating of a polymerization reaction and the formation of a graft copolymer. The monomeric compound and the molten or heatplastified polymer are maintained in contact with one another at the elevated temperatures for a time sufficient to polymerize all or substantially all of the monomers, then is extruded and cooled and cut or ground to a granular form. In an alternate procedure the heat-plastified polymer and the monomeric compound are maintained in contact with one another at the elevated reaction temperatures until at least a predominant amount of the monomer is polymerized, then is extruded, cooled and the graft copolymer separated from the reacted mixture.

The graft copolymer can be recovered in pure or substantially pure form by dissolving the graft copolymer and homopolymer present in a solvent such as toluene, xylene, ethylbenzene, isopropylbenzene and the like at above 80° C. and after cooling and adding a non-solvent such as methanol, filtering the fine powdered graft copolymer and homopolymer. The homopolymer can now be removed by allowing the powder to stand in a solvent which will dissolve only homopolymer (e.g., methylene chloride removes only polystyrene homopolymer from the crude graft copolymer).

The new graft copolymers and compositions comprising the graft copolymer together with homopolymer and/or copolymer of the monomers, are useful for a variety of purposes. They can be molded by usual compression and injection molding operations or by extrusion methods to form useful articles such as boxes, cups, trays, or rods, bars, sheet or film material. The graft copolymers may contain from 1 to 50, preferably from about 5 to about 35 percent by weight of the monomer chemically combined with the polymeric olefin substrate starting material. The graft copolymers and compositions comprising the graft copolymers possess good mechanical properties such as tensile strength, percent elongation and flexural modulus, and in general possess improvement in one or more of such properties over the similar properties for the polymeric substrate starting material.

The following examples illustrate ways in which the principle of the invention has been applied, but are not to be construed as limiting its scope.

EXAMPLE 1

In each of a series of experiments, polyethylene having a melt index of 2 was fed to a 1¼ inch diameter screw type plastics extruder, the barrel of which was heated at 190° C. by means of hot oil circulating through jackets surrounding the barrel. The polyethylene was pressed and heated to a molten condition in a first section of the barrel of the extruder then was mixed with monomeric styrene containing 0.03 percent by weight of tert.-butyl cathechol and 1.5 percent by weight of dicumyl peroxide, fed under pressure to a mid-section of the barrel of the extruder. The resulting mixture was blended in the remaining section of the extruder barrel at the elevated temperatures for a period of 2.5 minutes, then was extruded through a die into the atmosphere as a plurality of strands which were cooled and cut to a granular form. A portion of the product was dissolved in hot toluene then was precipitated in methyl alcohol to obtain the product in a finely divided form, which was separated by filtering, was washed with methyl alcohol and was dried. Weighed portions of the finely divided polymeric product were extracted with methylene chloride to remove homopolymer of styrene. The methylene chloride solution was poured into alcohol to precipitate the polymer and the latter was separated, washed and dried.

In each of the experiments the polymer extracted with methylene chloride was found to be polystyrene and was present in the product in an amount corresponding to about 50 percent by weight of the total chemically combined styrene, the remaining 50 percent of the styrene being chemically combined with the polyethylene as a graft copolymer.

Portions of the granular product consisting of the extruded material in granular form were injection molded to form test pieces of ⅛ x ½ inch cross section. These test pieces were used to determine the tensile strength and percent elongation for the product employing procedures similar to those described in ASTM D638–49T. Portions of the extracted polymeric product, i.e., the graft copolymer, were injection molded and were tested in similar manner. Table I identifies the experiments and gives the proportion in percent by weight of the grafted styrene and the homopolymer of styrene in the product. The table also gives the properties determined for the product.

Table I

| Run No. | Poly-ethylene, Percent | Polystyrene | | Tensile Strength, lbs./sq. in. | Elongation, Percent |
| --- | --- | --- | --- | --- | --- |
| | | Graft, Percent | Homo-polymer, Percent | | |
| 1 | 88 | 8 | 4 | 2,130 | 125 |
| 2 | 96 | 4 | 0 | 2,060 | 131 |
| 3 | 80 | 10 | 10 | 2,400 | 110 |
| 4 | 90 | 10 | 0 | 2,400 | 106 |
| 5 | 68 | 15 | 17 | 2,640 | 87 |
| 6 | 85 | 15 | 0 | 2,475 | 90 |

Similar results are obtained by substituting tert.-butyl hydroperoxide, di-tert.-butyl peroxide, tert.-butyl perbenzoate, di-tert.-butyl diperphthalate, methyl ethyl ketone peroxide, cumene hydroperoxide, benzoyl peroxide, tert.-butyl peracetate or other organic peroxygen compound which is a polymerization catalyst for the monomer and has a half-life of at least 15 minutes as determined by the decomposition rate in benzene at 100° C., for the dicumyl peroxide employed in the example.

EXAMPLE 2

In each of a series of experiments, a polymeric product comprising a mixture of a graft copolymer of styrene on polyethylene and homopolymer of styrene wherein approximately one-half of the chemically combined styrene in the polymeric product was homopolymer of styrene was prepared by intimately blending or masticating molten polyethylene having a melt index of 2 with monomeric styrene containing 0.03 percent by weight of tert.-butyl catechol and 1.5 percent by weight of dicumyl peroxide in a plastics extruder employing procedure similar to that employed in Example 1. The product was discharged from the extruder as a plurality of strands and was cooled and cut to a granular form. Portions of the product were analyzed to determine the proportion of styrene chemically combined therein, and other portions of the granular product were injection molded to form test pieces for determining the tensile strength and percent elongation values for the product employing procedures similar to those employed in Example 1. Table II identifies the experiments and gives the proportions in percent by weight of the graft copolymer and the homopolymer of styrene in the polymeric product. The table also gives the tensile strength and percent elongation values determined for the product. For purpose of comparison, a portion of the polyethylene starting material was molded and tested in the same manner and reported in Table II as Run No. 1.

Table II

| Run No. | Graft Co-polymer, Percent | Styrene Homo-polymer, Percent | Tensile Strength, lbs./sq. in. | Elongation, Percent |
| --- | --- | --- | --- | --- |
| 1 | [1] 100 | 0 | 1,480 | 157 |
| 2 | 94.5 | 5.5 | 1,713 | 175 |
| 3 | 91.0 | 9.0 | 1,826 | 197 |
| 4 | 84.0 | 16.0 | 2,265 | 139 |
| 5 | 74.5 | 25.5 | 2,606 | 25 |

[1] Polyethylene starting material.

EXAMPLE 3

A polymeric product consisting of a mixture of a graft copolymer of polyethylene and isomeric vinyltoluenes and homopolymer of the isomeric vinyltoluenes was prepared by intimately blending molten polyethylene having a melt index of 2 with monomeric vinyltoluene consisting of a mixture of approximately 65 percent by weight of meta-vinyltoluene and 35 percent of para-vinyltoluene containing 0.03 percent by weight of tert.-butyl catechol and 1.5 percent by weight of divinyl peroxide, in a plastics extruder employing procedure similar to that employed in Example 1. The product was discharged from the extruder, was cooled and was cut to a granular form. It was analyzed and found to consist of 90.25 percent by weight of graft copolymer and 9.75 percent by weight of homopolymer of the isomeric vinyltoluenes. The product had a tensile strength of 2163 lbs./sq. in., and an elongation value of 116 percent.

EXAMPLE 4

Polyethylene having a melt index of 2 was fed at a rate corresponding to 20 parts by weight per hour to a plastics extruder wherein it was pressed, heated to a molten condition and was blended with 20 parts by weight of a mixture of dichlorostyrenes containing 0.03 percent by weight of tert.-butyl catechol and 1.5 percent of dicumyl peroxide, to graft copolymerize the dichlorostyrenes thereupon, employing procedure similar to that employed in Example 1. The dichlorostyrene employed in the experiment was a fraction of isomeric compounds consisting of about 45 percent by weight 2,4-dichlorostyrene, 2 percent 2,3-dichlorostyrene and 2 percent 3,4-dichlorostyrene.

The granular product was analyzed and found to contain 19.5 percent by weight of chemically combined, i.e., polymerized, dichlorostyrenes. Approximately 50 percent by weight of the dichlorostyrene was present in the form of a graft copolymer chemically attached to the polyethylene base polymer and about 50 percent was present in the form of polymerized dichlorostyrene not chemically bound to the polyethylene. The polymeric product had a tensile strength of 2116 lbs./sq. in. and 102 percent elongation.

EXAMPLE 5

In each of a series of experiments a polymeric product comprising a graft copolymer was prepared by feeding polyethylene having a melt index of 2 to a 1¼ inch diameter screw type plastics extruder wherein it was pressed and heated to a temperature of 190° C. and was mixed and blended with a mixture of monomeric styrene and acrylonitrile which was fed under pressure to the barrel of the extruder. The styrene and acrylonitrile was fed into admixture with the molten polyethylene as a liquid mixture consisting of 71 percent by weight of styrene and 29 percent of acrylonitrile, which liquid contained 0.03 percent by weight of tert.-butyl catechol and 1.5 percent by weight of dicumyl peroxide. The mixture of the molten polyethylene and monomers were malaxated under pressure in the barrel of the extruder at a temperature of 190° C. for about 2.5 minutes, then was extruded through a die into the atmosphere and was cooled and cut to a granular form. The monomers were polymerized in contact with the molten polyethylene prior to the resulting heat-plastified polymeric product being discharged from the extruder. Portions of the product were dissolved in hot toluene then cooled to precipitate the polymer in finely divided form after which methyl alcohol was added. The product was separated by filtering. The finely divided product was extracted with hot methylene chloride to remove ungrafted copolymer of styrene and acrylonitrile. The graft copolymers and ungrafted copolymers were recovered and weighed. Other portions of the product as prepared were injection molded to form test bars which were used to determine the tensile strength and percent elongation for the product.

Portions of the graft copolymer, i.e., the product from which the ungrafted copolymer of styrene and acrylonitrile had been removed by extraction with hot methylene chloride, were also injection molded and tested for tensile strength and percent elongation. Table III identifies the experiments and gives the proportions in percent by weight of graft copolymer and ungrafted copolymer of styrene and acrylonitrile in the product. The table also gives the tensile strength and percent elongation determined for the product. Similar properties for the pure graft copolymer, i.e., the product from which the ungrafted copolymer was removed by extraction, are also reported in the table. For comparison, the tensile strength and percent elongation for the polyethylene starting material are also reported in Table III.

Table III

| Run No. | Product and its Composition | | | Properties | |
| --- | --- | --- | --- | --- | --- |
| | Polyethylene, Percent | Graft Co-polymer, Percent | Ungrafted Copolymer, Percent | Tensile Strength, lbs./sq. in. | Elongation, Percent |
| 1 | 93.4 | 6.2 | 0.4 | 1,980 | 140 |
| 2 | 86.3 | 11.0 | 2.7 | 1,850 | 155 |
| 3 | 76.0 | 12.0 | 12.0 | 2,700 | 70 |
| 4 | 71.1 | 13.6 | 15.3 | 2,830 | 53 |
| 5 | 93.8 | 6.2 | 0 | 2,400 | 110 |
| 6 | 89.0 | 11.0 | 0 | 2,700 | 90 |
| 7 | 88.0 | 12.0 | 0 | 2,600 | 72 |
| 8 | 86.4 | 13.6 | 0 | 2,600 | 75 |
| 9 | 100 | | | 1,146 | 157 |

Similar results are obtained when polymeric products comprising graft copolymers of polyethylene are prepared in the same way from polyethylene and mixtures of monomers consisting of from about 70 percent by weight of styrene and about 30 percent of methacrylonitrile, acrylic acid, methacrylic acid, methyl methacrylate, or maleic anhydride, in place of the acrylonitrile used in the example.

We claim:

1. A method for making a graft copolymer which comprises malaxating a normally solid resinous thermoplastic polymer selected from the group consisting of (a) homopolymers of aliphatic olefins containing from 2 to 4 carbon atoms in the molecule and (b) copolymers consisting of at least two interpolymerized aliphatic olefins containing from 2 to 4 carbon atoms in the molecule at heat-plastifying temperatures between 110° and 250° C., which avoids appreciable deterioration of the polymer molecules, while contacting the heat-softened polymer with a monomer selected from the group consisting of monovinyl aromatic hydrocarbons and nuclear halogenated monovinyl aromatic hydrocarbon of the benzene series having the vinyl radical directly attached to a carbon atom of the aromatic nucleus, and mixtures of a predominant amount of at least one such monovinyl aromatic compound of the benzene series and a minor proportion of another monoethylenically unsaturated compound selected from the group consisting of acrylonitrile, methacrylonitrile, acrylic acid, methacrylic acid, methyl methacrylate and maleic anhydride, having dissolved therein from 0.5 to 5 percent by weight of an organic peroxygen compound having a half-life of at least 15 minutes as determined in benzene at 100° C., and in amount corresponding to from about 1 to 100 parts by weight of said monomer per 100 parts by weight of the heat-softened olefin polymer, for a time sufficient to polymerize a predominant amount of the monomer.

2. A method for making a graft copolymer which comprises malaxating a normally solid resinous thermoplastic polymer selected from the group consisting of (a) homopolymers of aliphatic olefins containing from 2 to 4 carbon atoms in the molecule and (b) copolymers consisting of at least two interpolymerized aliphatic olefins containing from 2 to 4 carbon atoms in the molecule, at heat-plastifying temperatures between 110° and 250° C., which avoids appreciable deterioration of the polymer molecules, while contacting the heat-softened polymer with a monomer selected from the group consisting of monovinyl aromatic hydrocarbons and nuclear halogenated monovinyl aromatic hydrocarbons of the benzene series having the vinyl radical directly attached to a carbon of the aromatic nucleus, and mixtures of a predominant amount of at least one monovinyl aromatic compound of the benzene series and a minor proportion of another monoethylenically unsaturated compound selected from the group consisting of acrylonitrile, methacrylonitrile, acrylic acid, methacrylic acid, methyl methacrylate and maleic anhydride, having dissolved therein from 0.5 to 5 percent by weight of an organic peroxygen compound having a half-life of at least 15 minutes as determined in benzene at 100° C. and in amount corresponding to from 1 to 100 parts by weight of said monomer per 100 parts by weight of the heat-softened polymer for a time sufficient to polymerize at least a predominant amount of said monomer and thereafter separating the graft copolymer from the reacted mixture.

3. A method according to claim 2, wherein the polymer is polyethylene.

4. A method according to claim 2, wherein the monomer is styrene.

5. A method according to claim 2 wherein the polymer is polypropylene.

6. A method according to claim 2, wherein the monomer is a mixture of styrene and acrylonitrile.

7. A method for making a graft copolymer which comprises malaxating polyethylene at heat-plastifying temperatures between 110° and 250° C., which avoid appreciable deterioration of the polymer molecules, while contacting the heat-softened polyethylene with styrene containing from 0.5 to 5 percent by weight of an organic peroxygen compound having a half-life of at least 15 minutes as determined in benzene at 100° C. and in amount corresponding to from 1 to 100 parts by weight of the styrene per 100 parts by weight of the heat-softened polyethylene for a time sufficient to polymerize at least a predominant amount of the styrene and thereafter separating the graft copolymer from the reacted mixture.

8. A method for making a graft copolymer which comprises malaxating polyethylene at heat-plastifying temperatures between 110° and 250° C., which avoid appreciable deterioration of the polymer molecules, while contacting the heat-softened polyethylene with a mixture of styrene and acrylonitrile having from 0.5 to 5 percent by weight of an organic peroxygen compound having a half-life of at least 15 minutes as determined in benzene at 100° C. and in amount corresponding to from 1 to 100 parts by weight of the styrene and acrylonitrile per 100 parts by weight of the heat-softened polyethylene for a time sufficient to polymerize at least a predominant amount of the monomers and thereafter separating the graft copolymer from the reacted mixture.

9. A graft copolymer obtained by the method of claim 1.

References Cited by the Examiner

UNITED STATES PATENTS

| | | | |
|---|---|---|---|
| 2,927,047 | 3/60 | Schuelde et al. | 260—878 |

FOREIGN PATENTS

| | | |
|---|---|---|
| 205,272 | 11/56 | Australia. |
| 219,935 | 1/59 | Australia. |
| 679,562 | 9/52 | Great Britain. |
| 814,393 | 6/59 | Great Britain. |

LEON J. BERCOVITZ, *Primary Examiner.*